United States Patent
Smith et al.

(10) Patent No.: US 10,959,395 B2
(45) Date of Patent: Mar. 30, 2021

(54) POULTRY CURTAIN TRAILER SYSTEM

(71) Applicant: Smithway, Inc., Fairview, NC (US)

(72) Inventors: Rocky Smith, Fairview, NC (US); GD Smith, Fairview, NC (US)

(73) Assignee: Smithway, Inc., Fairview, NC (US)

( * ) Notice: Subject to any disclaimer, the term of this patent is extended or adjusted under 35 U.S.C. 154(b) by 310 days.

(21) Appl. No.: 16/017,207

(22) Filed: Jun. 25, 2018

(65) Prior Publication Data

US 2018/0368352 A1 Dec. 27, 2018

Related U.S. Application Data

(60) Provisional application No. 62/524,060, filed on Jun. 23, 2017.

(51) Int. Cl.
| | |
|---|---|
| *B60P 3/20* | (2006.01) |
| *A01K 1/00* | (2006.01) |
| *B62D 63/08* | (2006.01) |
| *B60H 1/00* | (2006.01) |
| *B60P 3/04* | (2006.01) |
| *B62D 33/04* | (2006.01) |

(52) U.S. Cl.
CPC .......... *A01K 1/0035* (2013.01); *A01K 1/0052* (2013.01); *A01K 1/0064* (2013.01); *A01K 1/0082* (2013.01); *B60H 1/00014* (2013.01); *B60H 1/00364* (2013.01); *B60H 1/00592* (2013.01); *B60H 1/00785* (2013.01); *B60P 3/04* (2013.01); *B60P 3/205* (2013.01); *B62D 33/042* (2013.01); *B62D 63/08* (2013.01)

(58) Field of Classification Search
CPC .. A01K 1/0035; A01K 1/0052; A01K 1/0064; A01K 1/0082; B60H 1/00014; B60H 1/00364; B60H 1/00592; B60H 1/00785; B60P 3/04; B60P 3/205; B62D 33/042; B62D 63/08
USPC .......................................................... 119/401
See application file for complete search history.

(56) References Cited

U.S. PATENT DOCUMENTS

| | | | | |
|---|---|---|---|---|
| 1,702,781 A | * | 2/1929 | Johnson | ............. B61D 27/0081 |
| | | | | 119/401 |
| 3,362,179 A | * | 1/1968 | Kirkpatrick | ........... F25D 17/005 |
| | | | | 62/97 |
| 4,454,837 A | * | 6/1984 | Luebke | .................... B60P 3/04 |
| | | | | 119/401 |

(Continued)

*Primary Examiner* — Claude J Brown
(74) *Attorney, Agent, or Firm* — William G. Heedy; The Van Winkle Law Firm

(57) ABSTRACT

A trailer for transporting living fowl includes a first enclosure and a second enclosure that are separated by a partition wall, each of the first and second enclosures being defined by a top, a floor, the partition wall, a rear wall, a first side wall and a second side wall; an apparatus for generating conditioned air to be supplied to the first and second enclosures; the partition wall having a length extending vertically between the floor and the ceiling and a width extending horizontally between the first and second side walls; the partition wall including a plurality of fans being structured and disposed for creating a path of airflow of the conditioned air throughout the first and second enclosures; and a plurality of air supply ducts in fluid flow communication with the apparatus for generating conditioned air.

7 Claims, 6 Drawing Sheets

(56) References Cited

U.S. PATENT DOCUMENTS

| | | | | |
|---|---|---|---|---|
| 4,553,584 A | * | 11/1985 | Bloomquist | B60H 1/00014 |
| | | | | 165/263 |
| 2002/0185880 A1 | * | 12/2002 | Miller | B60P 3/20 |
| | | | | 296/24.35 |
| 2013/0074777 A1 | * | 3/2013 | Smith | B60P 3/04 |
| | | | | 119/401 |
| 2014/0305147 A1 | * | 10/2014 | Goux | F25D 11/003 |
| | | | | 62/89 |
| 2016/0101674 A1 | * | 4/2016 | Riviere | F25D 23/023 |
| | | | | 62/89 |
| 2016/0334142 A1 | * | 11/2016 | Senf, Jr. | F25B 49/02 |

* cited by examiner

POULTRY CURTAIN TRAILER SYSTEM

RELATED APPLICATION

This application claims priority to and incorporates entirely by reference U.S. Provisional Patent Application Ser. No. 62/524,060 filed on Jun. 23, 2017.

FIELD OF THE INVENTION

This invention relates to trailers for transporting living fowl and, more particularly, it relates to trailers which provide conditioned air to the interior of the trailer during the transport of living fowl.

BACKGROUND OF THE INVENTION

For many years, fowl was transported in an open trailer. This technique permits a great deal of air circulation for cooling the fowl during transport. However, it is no longer widely accepted because of the direct exposure of fowl to the elements and because of damage to the fowl caused by high velocity air flow. One of the problems in transporting large numbers of living fowl, such as chickens, is the need to remove excess heat from their immediate environment, particularly during the summer months to ensure that a large number of the fowl will survive the transport. Another problem is the need to provide heat in their immediate environment during the winter months, also to ensure that a large number of the fowl will survive the transport.

Recently, fowl have been transported in closed trailers. These closed trailers have included air handling ducts and fans for circulating air. The air ducts may be connected to various sources of forced air, such as air conditioners, fans, and, in some cases, forced air heaters for winter transport. Air is often circulated from open grates in a false bottom floor of the trailer which run the length of the trailer, as described in U.S. Pat. No. 6,581,544 issued to Rocky L. Smith. Even with more sophisticated environmental control systems, such as the trailer described in U.S. Pat. No. 8,794,187 issued to Rocky L. Smith, hot spots have developed where circulation is poor. It has been found that many of the fowl in the areas having hot spots do not survive a long transport.

In light of the problems discussed above, there exists a need for a trailer for transporting living fowl for providing increased precision of heating and cooling, as well as lowering the humidity conditions.

SUMMARY OF THE INVENTION

In accordance with one form of the present invention, there is provided a trailer for transporting living fowl including a first enclosure and a second enclosure that are separated by a partition wall, each of the first and second enclosures being defined by a top, a floor, the partition wall, a rear wall, a first side wall and a second side wall; at least one stack of cages; wherein the first and second side walls are made of a thermally insulated fabric along the majority of the trailer's length, and having at least one movable side wall and wherein the stack of cages containing the living fowl may be loaded and unloaded from a side of the trailer; an apparatus for generating conditioned air to be supplied to the first and second enclosures; the partition wall having a length extending vertically between the floor and the ceiling and a width extending horizontally between the first and second side walls; the partition wall including a plurality of fans being structured and disposed for creating a path of airflow of the conditioned air throughout the first and second enclosures; a plurality of air supply ducts in fluid flow communication with the apparatus for generating conditioned air, the plurality of air supply ducts including opposing vertical air supply ducts extending along the side walls adjacent the partition wall and a horizontal air supply duct extending along the floor adjacent the partition wall; at least one temperature sensor for detecting the temperature within the first and second enclosures; and at least one humidity sensor for detecting the humidity level with the first and second enclosures.

In accordance with another form of the present invention, there is provided a trailer for transporting living fowl including a first enclosure and a second enclosure that are separated by a partition wall, each of the first and second enclosures being defined by a top, a floor, the partition wall, a rear wall, a first side wall and a second side wall; an apparatus for generating conditioned air to be supplied to the first and second enclosures; the partition wall having a length extending vertically between the floor and the ceiling and a width extending horizontally between the first and second side walls; the partition wall including a plurality of fans being structured and disposed for creating a path of airflow of the conditioned air throughout the first and second enclosures; and a plurality of air supply ducts in fluid flow communication with the apparatus for generating conditioned air.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTION OF THE PREFERRED EMBODIMENTS

Referring to the several views of the drawings, the trailer for transporting living fowl of the present invention is shown and described herein and is generally indicated as 10.

Figure 1:
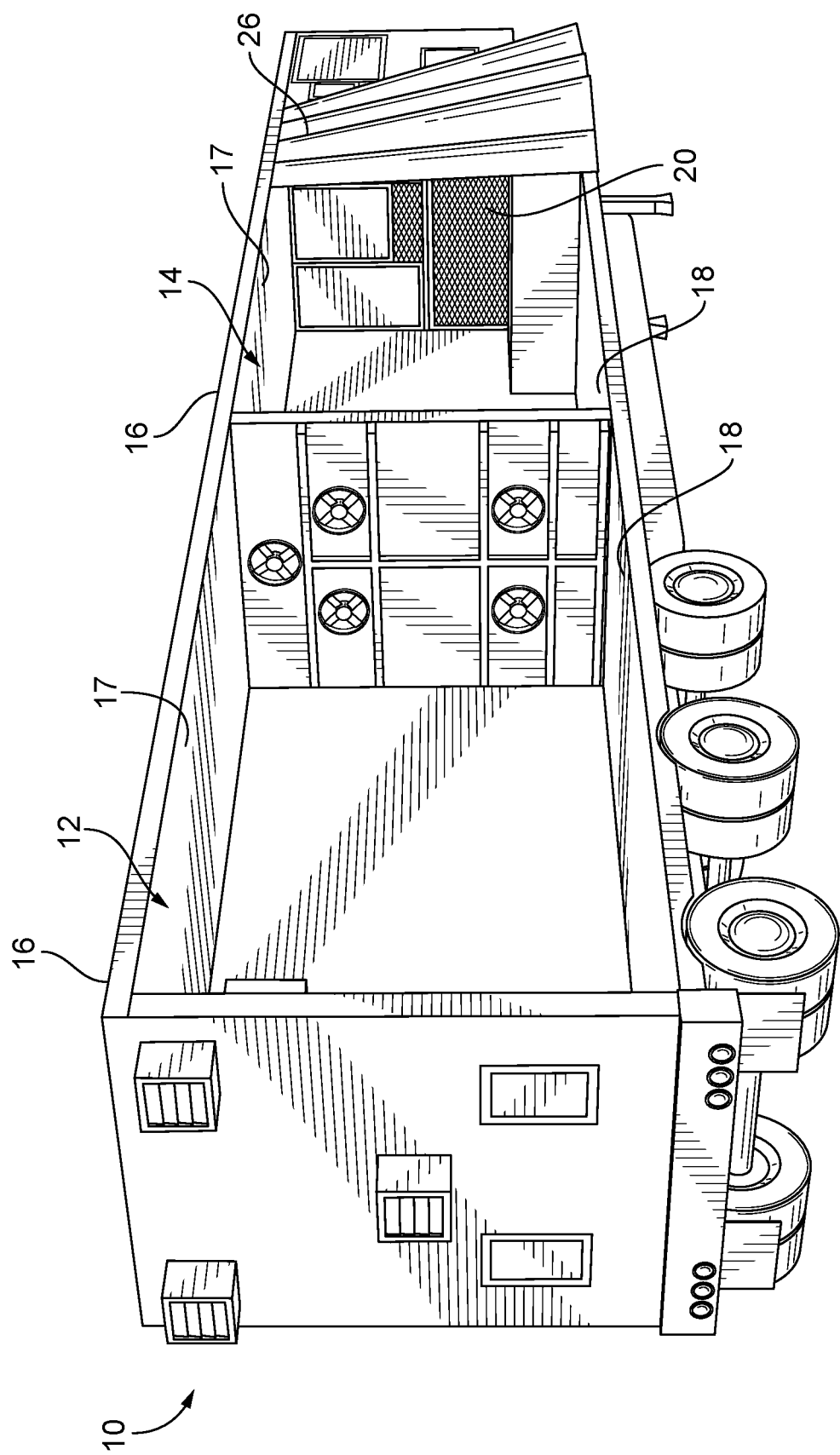
FIG. 1 is a perspective view of the trailer surrounding an enclosure for transporting living fowl according to one embodiment.
Figure 2:
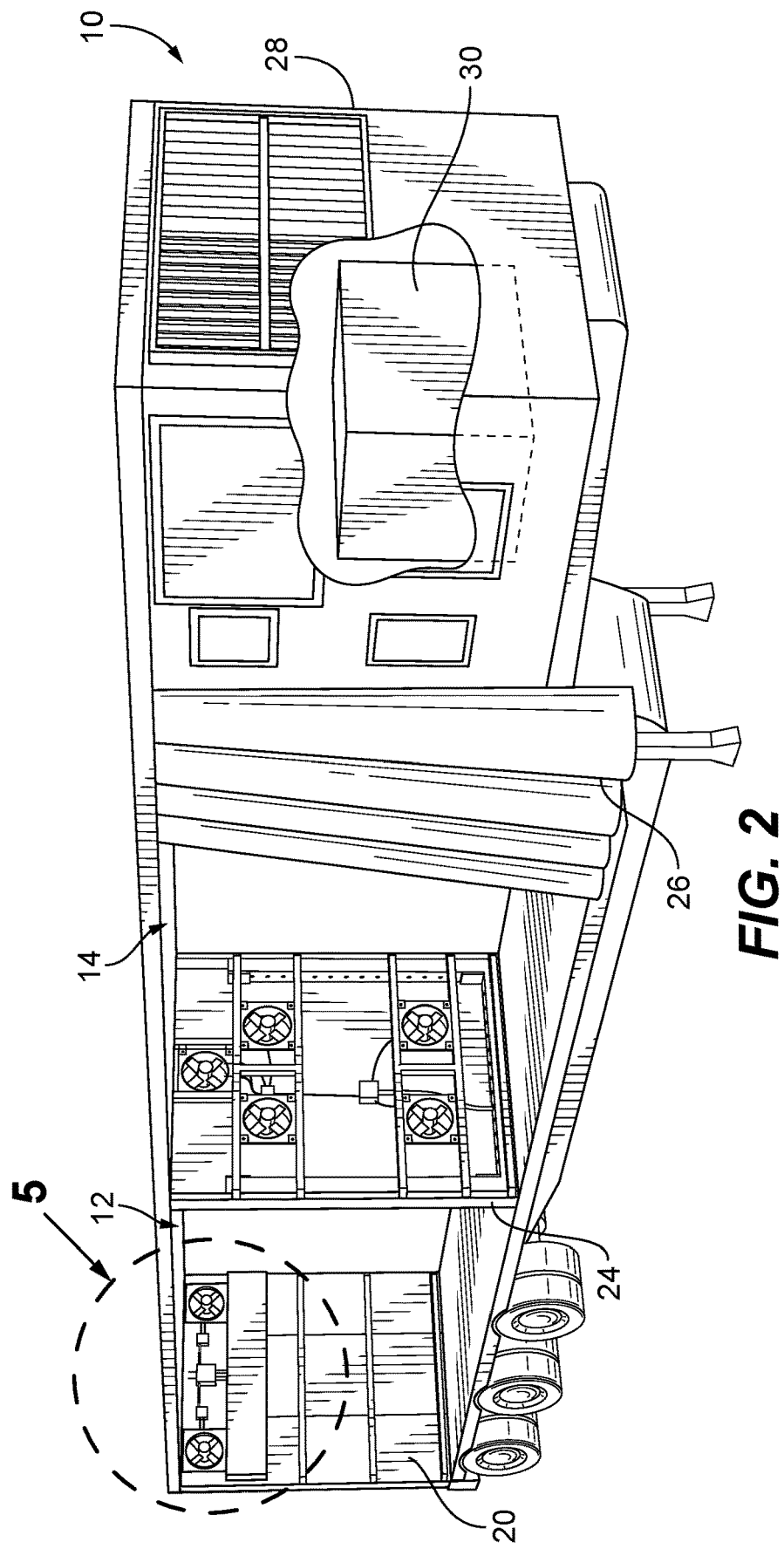
FIG. 2 is another perspective view thereof.
Figure 3:
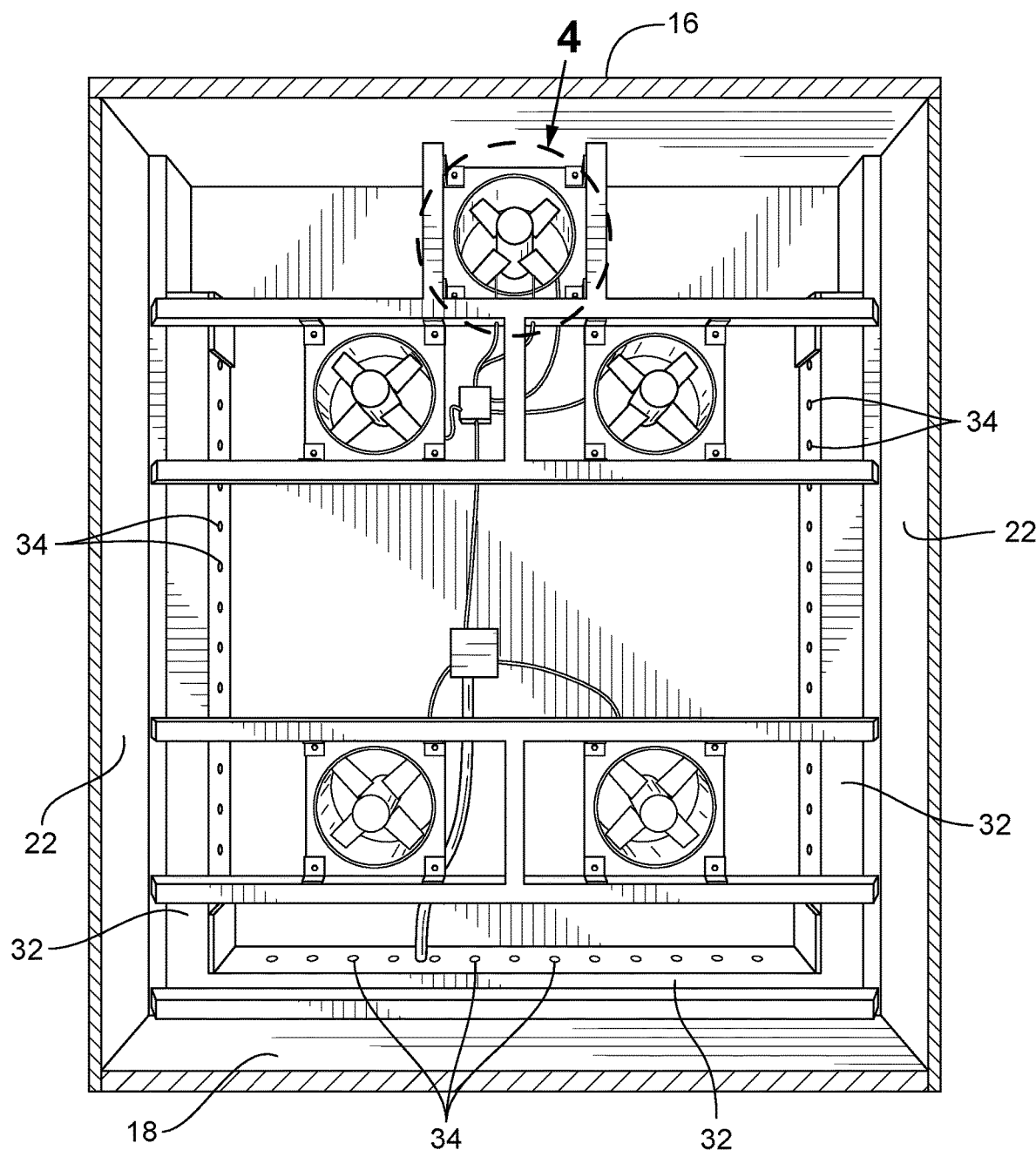
FIG. 3 is a front elevational view shown in cross section taken along line 3-3 in FIG. 2.

Referring initially to FIGS. 1-3, there is provided a trailer 10 for transporting living fowl. Trailer 10 includes a first enclosure 12 and a second enclosure 14. Each of the first and second enclosures 12 and 14 is adapted to receive a plurality of modules in the form of stacks of cages containing living fowl. Modules have bases, each having a slot to enable the modules to be easily loaded and unloaded by a forklift. Preferably, each module includes six stacked cages. The terms "modules" and "stacked cages" are used herein interchangeably. The modules are secured in place inside the first enclosure by spaced apart brackets which are welded to the floor of first enclosure and by the upwardly extending floor ducts referred to below. Brackets and the floor ducts are particularly helpful in stabilizing the modules when the trailer is moving.

The first and second enclosures 12 are each further defined by top wall 16, floor 18, rear wall 20, side walls 22 and a partition wall 24 which divides the first enclosure 12 and the second enclosure 14. The top wall 16 includes a ceiling 17, which is on the inside of the first and second enclosures 12 and 14. In a preferred embodiment, each side wall 22 is in the form of a pair of movable curtains 26. These movable curtains 26 are preferably made of an insulated fabric. The side walls 22 are preferably in the form of accordion-like structures so that the side walls 22 are readily opened and closed. The ability to open the side walls 22 enables the multi-stacks of cages containing the fowl to be readily loaded and unloaded using a fork lift at the side of the trailer 10. Thus, there is no need to drive a fork lift into the inside of the trailer 10 to load and unload the trailer 10. Loading and unloading the cages of fowl from the side of the trailer 10 provides for a much more efficient loading and unloading operation. In addition, damage to the trailer 10 during loading and unloading is greatly reduced.

A third enclosure 28 houses an apparatus 30 for generating conditioned air to provide conditioned air to the inside of the first and second enclosures 12 and 14. Apparatus 30 preferably includes an air conditioning unit and a heating unit in fluid flow communication with air supply ducts 32 located throughout the first and second enclosures 12 and 14. Holes 34 along the air supply ducts 32 open into the inside of the first and second enclosures 12 and 14 for providing air flow throughout the first and second enclosures 12 and 14. In a preferred embodiment, air supply ducts 32 extend vertically along the side walls 22 adjacent the partition wall 24 and horizontally along the floor adjacent the partition wall 24.

Still referring to FIGS. 1-3, the length of the partition wall 24 extends vertically between the floor 18 and ceiling 17 and the width of the partition wall 24 extends horizontally between the opposing side walls 22 of the first and second enclosures 12 and 14. The partition wall 24 is preferably located approximately at the midpoint of length of the trailer 10 such that the respective lengths of the first and second enclosures 12 and 14 are approximately equal. The partition wall 24 includes a plurality of fans 36 thereon wherein opposing sides of each of the plurality of fans 36 are exposed to first and second enclosures 12 and 14, respectively, thereby creating a general path of airflow throughout the first and second enclosures 12 and 14. The partition wall 24 provides for smaller zones (as compared to trailers having a single enclosure) for more readily controlling the heating and cooling within the first and second enclosures 12 and 14, as well as the overall ventilation within the first and second enclosures 12 and 14.

Figure 4:
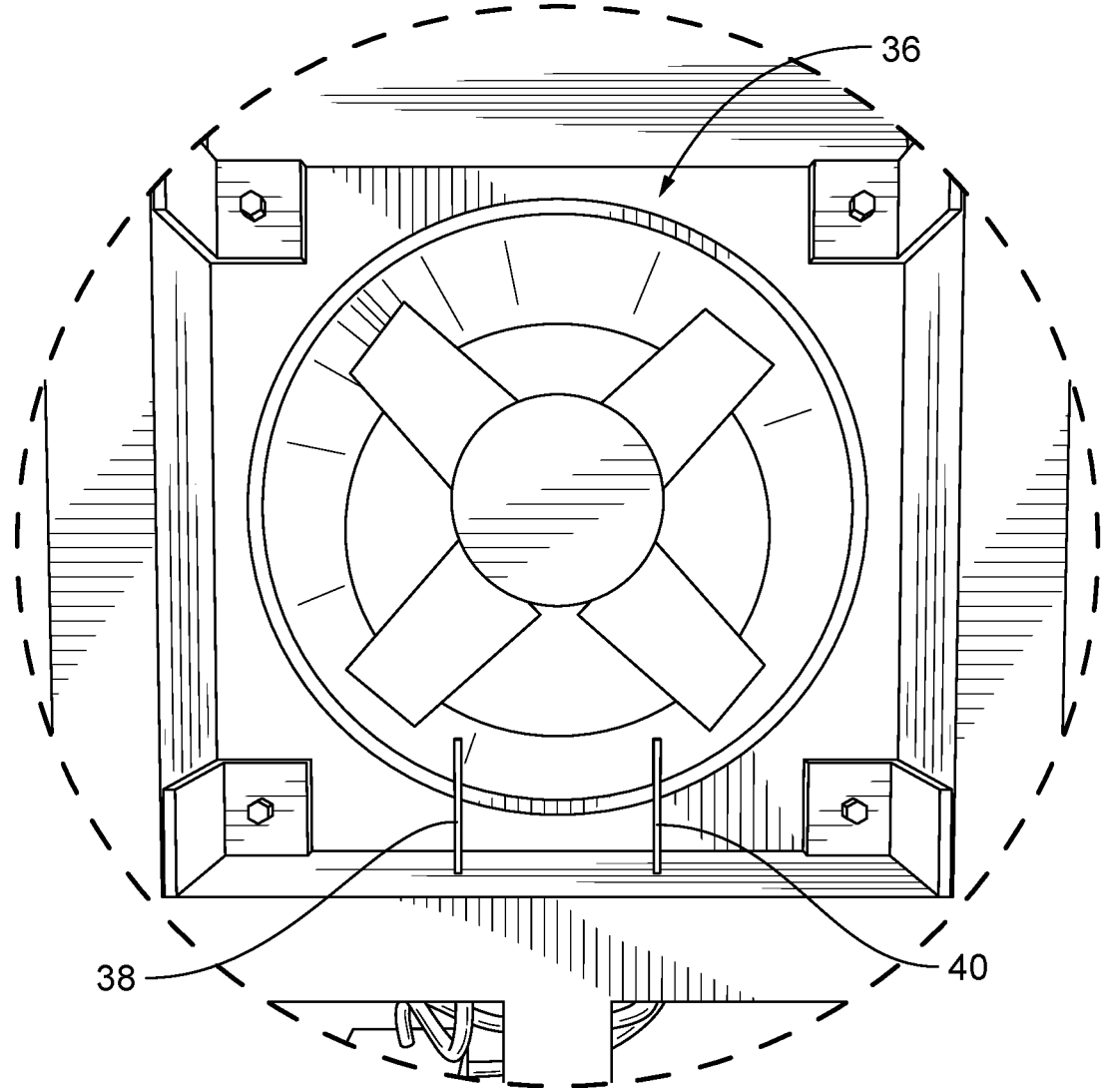
FIG. 4 is an isolated view taken from FIG. 3 illustrating sensors on the partition wall.
Figure 5:
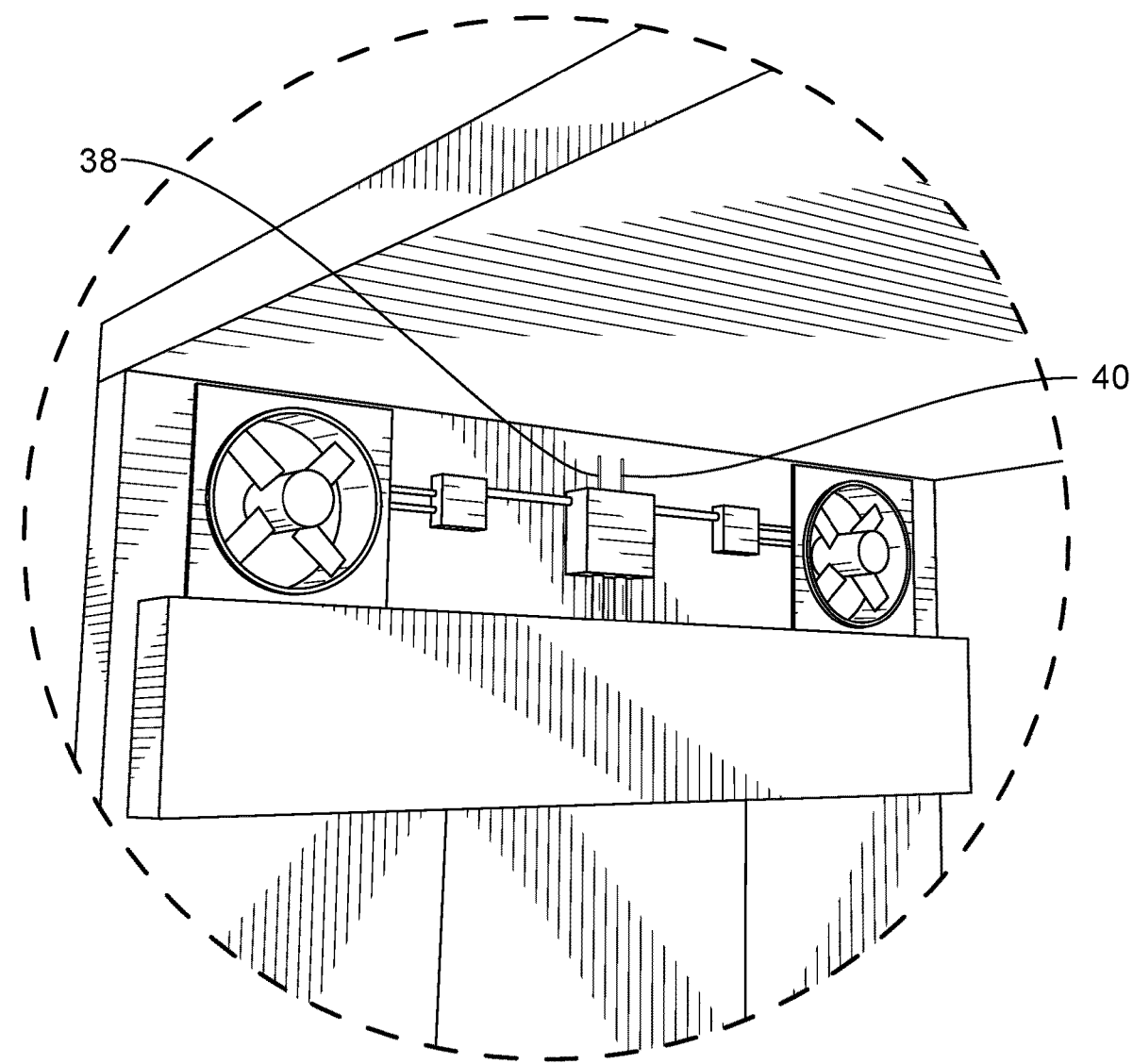
FIG. 5 is an isolated view taken from FIG. 2 illustrating sensors on the rear wall.

Referring specifically to FIGS. 4 and 5, at least one temperature sensor 38 is provided for gathering local temperature data for ensuring ideal temperature conditions within the first and second enclosures 12 and 14. In one embodiment, as shown throughout the accompanying figures, a first temperature sensor 38 is provided on the partition wall 24 and a second temperature sensor 38 is provided on the rear wall 20 of the second enclosure 14. Temperature sensors 38 may also be located adjacent the front air intake on the roadside of the trailer 10 and the front air intake on the curbside of the trailer 10.

Still referring to FIGS. 4 and 5, in order to monitor humidity for ensuring low humidity conditions, the first and second enclosures 12 and 14 include at least one humidity sensor 40. In one embodiment, as shown throughout the accompanying figures, a first humidity sensor 40 is provided on the partition wall 24 and a second humidity sensor 40 is provided on the rear wall 20 of the second enclosure 14. In one embodiment, the at least one humidity sensor 40 is in connection with the apparatus 30 for generating conditioned air. In one embodiment, the at least one humidity sensor 40 and the at least one temperature sensor 38 are in connection with a computing system that is in connection with the apparatus 30 for generating conditioned air such that the heating, cooling and ventilation systems may be remotely adjusted based on the data obtained via the sensors 38 and 40. In one embodiment, the apparatus 30 for generating conditioned air automatically adjusts in accordance with preset configurations based on the sensor data.

Figure 6:
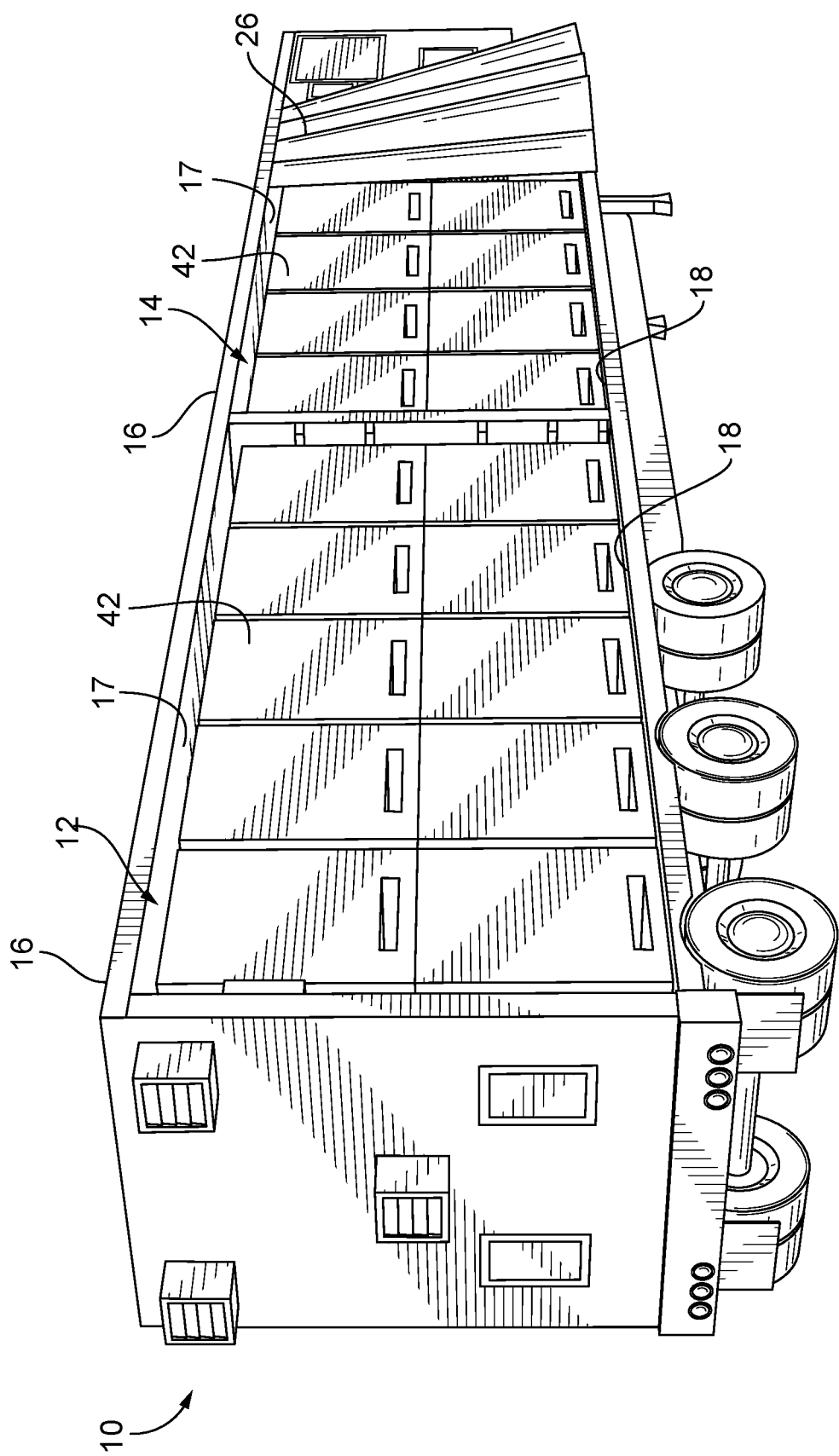
FIG. 6 is a perspective view of the trailer surrounding an enclosure for transporting living fowl and including stacks of cages.

Referring now to FIG. 6, each of the first and second enclosures 12 and 14 are adapted to receive a plurality of modules in the form of stacks of cages 42 containing living fowl.

While the present invention has been shown and described in accordance with several preferred and practical embodiments, it is recognized that departures from the instant disclosure are contemplated within the spirit and scope of the present invention.

What is claimed is:

1. A trailer for transporting living fowl comprising:
   a first enclosure and a second enclosure that are separated by a partition wall, each of the first and second enclosures being defined by a top, a floor, the partition wall, a rear wall, a first side wall and a second side wall;
   at least one stack of cages;
   wherein the first and second side walls are made of a thermally insulated fabric along the majority of the trailer's length, and having at least one movable side wall and wherein the stack of cages containing the living fowl may be loaded and unloaded from a side of the trailer;
   an apparatus for generating conditioned air to be supplied to the first and second enclosures;
   the partition wall having a length extending vertically between the floor and the ceiling and a width extending horizontally between the first and second side walls;
   the partition wall including a plurality of fans being structured and disposed for creating a path of airflow of the conditioned air throughout the first and second enclosures;
   a plurality of air supply ducts in fluid flow communication with the apparatus for generating conditioned air, the plurality of air supply ducts including opposing vertical air supply ducts extending along the side walls adjacent the partition wall and a horizontal air supply duct extending along the floor adjacent the partition wall;
   wherein said vertical air supply ducts include holes oriented perpendicular to the side walls;
   wherein said horizontal air supply duct includes holes oriented perpendicular to the floor;
   at least one temperature sensor for detecting the temperature within the first and second enclosures; and
   at least one humidity sensor for detecting the humidity level with the first and second enclosures.

2. The trailer for transporting living fowl as recited in claim 1 further comprising a third enclosure that is sized and configured for housing the apparatus for generating conditioned air.

3. The trailer for transporting living fowl as recited in claim 1 wherein the partition wall is located approximately at the midpoint of length of the trailer such that the respective lengths of the first and second enclosures are approximately equal.

4. The trailer for transporting living fowl as recited in claim 1 wherein the at least one temperature sensor includes a first temperature sensor on the partition wall and a second temperature sensor on the rear wall of the second enclosure.

5. The trailer for transporting living fowl as recited in claim 1 wherein the at least one humidity sensor includes a first humidity sensor on the partition wall and a second humidity sensor on the rear wall of the second enclosure.

6. The trailer for transporting living fowl as recited in claim 1 wherein the apparatus for generating conditioned air automatically adjusts the temperature of the conditioned air in accordance with preset configurations based on the temperature detected within the first and second enclosures.

7. The trailer for transporting living fowl as recited in claim 1 wherein the apparatus for generating conditioned air is remotely adjustable.

* * * * *